United States Patent
Jung et al.

(10) Patent No.: US 8,190,354 B2
(45) Date of Patent: May 29, 2012

(54) FUEL EFFICIENCY MEASUREMENT SYSTEM AND METHOD FOR FUEL CELL VEHICLE

(75) Inventors: Young Woo Jung, Incheon (KR); Jeong Kyu Park, Gyeonggi-do (KR); Hyung Seuk Oh, Gyeonggi-do (KR); Chang Hwan Ye, Osan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 1000 days.

(21) Appl. No.: 12/156,407

(22) Filed: May 29, 2008

(65) Prior Publication Data
US 2009/0030625 A1   Jan. 29, 2009

(30) Foreign Application Priority Data

Jul. 18, 2007   (KR) .................. 10-2007-0071962

(51) Int. Cl.
*G01R 31/36* (2006.01)

(52) U.S. Cl. ............ 701/123; 702/101; 702/97; 702/60; 429/400

(58) Field of Classification Search ............. 701/123; 702/101, 97, 60; 429/400, 411; *G01R 31/36*
See application file for complete search history.

(56) References Cited

U.S. PATENT DOCUMENTS

| | | | | |
|---|---|---|---|---|
| 6,725,151 B2* | 4/2004 | Itou | | 701/123 |
| 7,096,131 B2* | 8/2006 | Takase et al. | | 702/63 |
| 7,422,810 B2* | 9/2008 | Venkataraman et al. | | 429/411 |
| 7,807,313 B2* | 10/2010 | Kaye et al. | | 429/465 |
| 7,906,241 B2* | 3/2011 | Kusano et al. | | 429/413 |
| 2002/0177020 A1* | 11/2002 | Iio | | 429/22 |
| 2005/0247123 A1* | 11/2005 | Fuse | | 73/290 R |
| 2007/0122669 A1* | 5/2007 | Kusano et al. | | 429/26 |
| 2007/0151527 A1* | 7/2007 | Shinagawa et al. | | 123/3 |
| 2007/0196702 A1* | 8/2007 | Sridhar et al. | | 429/17 |
| 2008/0050632 A1* | 2/2008 | Salter et al. | | 429/30 |
| 2008/0193804 A1* | 8/2008 | Suzuki et al. | | 429/13 |
| 2008/0241614 A1* | 10/2008 | McCanney | | 429/20 |
| 2009/0016401 A1* | 1/2009 | Hamada et al. | | 374/10 |
| 2009/0197129 A1* | 8/2009 | Shimoi et al. | | 429/17 |
| 2009/0252997 A1* | 10/2009 | Katano et al. | | 429/13 |

FOREIGN PATENT DOCUMENTS

JP          2007057422 A    *   3/2007

* cited by examiner

*Primary Examiner* — Tuan C. To
(74) *Attorney, Agent, or Firm* — Edwards Wildman Palmer LLP; Peter F. Corless

(57) ABSTRACT

A fuel efficiency measurement system includes a fuel supply tank for supplying hydrogen to be used as a fuel to a fuel cell of the vehicle during measurement of fuel efficiency and a precision electronic balance for detecting a weight of the fuel supply tank so as to perform the measurement of fuel efficiency based on a vehicle driving distance and a change in weight of the fuel supply tank measured by the electronic balance during measurement of fuel efficiency. According to the fuel efficiency measurement system, it is possible to more accurately calculate fuel efficiency without using hydrogen of a hydrogen tank installed in the vehicle.

6 Claims, 3 Drawing Sheets

FUEL EFFICIENCY MEASUREMENT SYSTEM AND METHOD FOR FUEL CELL VEHICLE

CROSS-REFERENCE TO RELATED APPLICATION

This application claims under 35 U.S.C. §119(a) the benefit of Korean Patent Application No. 10-2007-0071962 filed Jul. 18, 2007, the entire contents of which are incorporated herein by reference.

BACKGROUND (a) Technical Field

The present invention relates to a fuel efficiency measurement system and method for a fuel cell vehicle, which can accurately measure fuel efficiency of a fuel cell vehicle.

(b) Background Art

Generally a fuel cell is considered as a future electricity generation system due to its high efficiency of electricity generation and its zero emission characteristic. The fuel cell has been extensively studied as a promising power source for a vehicle, which can solve various problems such as environmental pollution and global warming that has been recently issued.

The fuel cell is a device that converts chemical energy, generated by oxidizing a material having activity such as hydrogen (e.g. LNG, LPG, methanol, etc.) through an electrochemical reaction, directly into electrical energy. In general, the fuel cell uses hydrogen, which is easily generated from natural gas, and oxygen in air.

In case of a hydrogen fuel cell vehicle equipped with the above-described fuel cell that uses hydrogen as a fuel, it is impossible to measure fuel efficiency by a method applied to internal combustion engine vehicles, i.e., with the carbon content contained in the exhaust gas, and thus a new fuel efficiency measurement method for the hydrogen fuel cell vehicle is required.

The fuel efficiency measurement method applied to the hydrogen fuel cell vehicle shown in FIG. 1 includes measurement based on a change in temperature and pressure of a hydrogen tank 11, measurement based on an amount of hydrogen supplied to a fuel cell 14, and measurement based on the current of the fuel cell 14. In this case, sensors provided for the fuel efficiency measurement include a temperature sensor 1 and a pressure sensor 2 of the hydrogen tank 11, a flow sensor 3 for measuring the amount of hydrogen supplied to the fuel cell 14, and a current sensor 4 for measuring the current amount of the fuel cell 14.

The fuel efficiency of the hydrogen fuel cell vehicle is measured based on an amount of hydrogen used in the fuel cell 14 and a driving distance and expressed as gasoline equivalent fuel efficiency through an equivalent energy amount of hydrogen for the purpose of comparison with that of the internal combustion engine vehicle.

Like this, in calculating the fuel efficiency of the hydrogen fuel cell vehicle, it is important to accurately measure the amount of hydrogen supplied from the hydrogen tank 11, and the conventional fuel efficiency measurement methods have the following drawbacks.

Although the measurement method based on the change in temperature and pressure of the hydrogen tank has an advantage of calculating a hydrogen purge amount, the errors of the pressure and temperature sensors are large, and soaking is required.

Moreover, although the measurement method based on the amount of hydrogen supplied has an advantage of calculating the hydrogen purge amount, the error of the hydrogen flow sensor is quite large.

Furthermore, although the measurement method based on the current amount of the fuel cell has an advantage in that the calculation of the current amount and the reactivity are excellent, it is impossible to estimate the hydrogen purge amount and the error of the current sensor is quite large.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art.

In one aspect, the present invention provides a fuel efficiency measurement system for a fuel cell vehicle equipped with a fuel cell that uses hydrogen as a fuel, the system comprising: a fuel supply tank for supplying hydrogen to be used as a fuel to the fuel cell; a main pipe having an inlet end connected to a hydrogen supply pipe coupled to an outlet valve of the fuel supply tank and an outlet end connected to a hydrogen injection pipe of the vehicle such that hydrogen from the fuel supply tank is supplied to the hydrogen injection pipe so as to be used as a fuel in the fuel cell; a high pressure regulator provided on the main pipe and reducing the pressure of hydrogen supplied from the fuel supply tank to a pressure that can be used in the fuel cell; a plurality of valves provided on the main pipe; a hydrogen discharge pipe connected to an excess flow valve of the fuel supply tank to discharge hydrogen at an excess pressure of the fuel supply tank to the outside when the excess flow valve is opened; an electronic balance for detecting a weight of the fuel supply tank; and a system control unit for receiving a detection value based on the weight of the fuel supply tank from the electronic balance, communicating with a power control unit in a state where the system is connected to the vehicle, and controlling the overall operation of various valves in the system and the vehicle and the overall operation of the system, wherein the system control unit calculates fuel efficiency based on a vehicle driving distance transmitted from the power control unit and a difference between weights of the fuel supply tank before and after driving the vehicle, detected by and transmitted from the electronic balance.

In another aspect, the present invention provides a fuel efficiency measurement method for a fuel cell vehicle equipped with a fuel cell that uses hydrogen as a fuel, the method comprising: connecting a main pipe of a fuel efficiency measurement system to a hydrogen injection pipe of the vehicle; receiving the information of a weight of a fuel supply tank in the fuel efficiency measurement system before turning on a starter key; supplying through the main pipe and the hydrogen injection pipe of the vehicle hydrogen of the fuel supply tank in the fuel efficiency measurement system to the fuel cell of the vehicle to be used as a fuel in a state where the hydrogen supply to a hydrogen supply system in the vehicle is cut off during measurement of fuel efficiency; calculating fuel efficiency based on a vehicle driving distance and a difference between weights a change in weight of the fuel supply tank before and after driving the vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
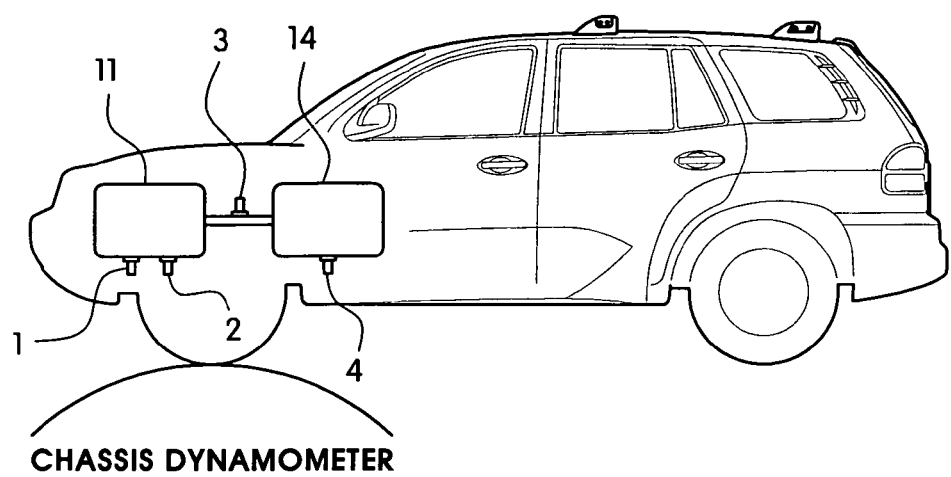
FIG. 1 is a schematic diagram showing a conventional method and system for measurement of fuel efficiency of a fuel cell vehicle.

Reference numerals set forth in the Drawings includes reference to the following elements as further discussed below:

| | |
|---|---|
| 10: power control unit (PCU) | 11: hydrogen tank |
| 11a: outlet valve | 12: hydrogen supply pipe |
| 14: fuel cell | 15: hydrogen injection pipe |
| 100: fuel efficiency measurement system | |
| 101: system control unit | 102: electronic balance |
| 103: hydrogen sensor | 110: fuel supply tank |
| 111: hydrogen supply pipe | 110a: outlet valve |
| 120: purge hydrogen tank | 120a: outlet valve |
| 121: hydrogen supply pipe | 122: supply branch pipe |
| 130: main pipe | 131: first discharge branch pipe |
| 132: discharge pipe | 133: second discharge branch pipe |
| 140: hydrogen discharge pipe | C1: coupler |
| C2: coupler | C3: break-away coupler |
| E1: excess flow valve | G1: gauge |
| HPR1: high pressure regulator | HPR2: high pressure regulator |
| PRV: pressure relief valve | R1: pressure gauge |
| V1 to V6: valves | V7: inlet valve |
| V8: 3-way valve | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
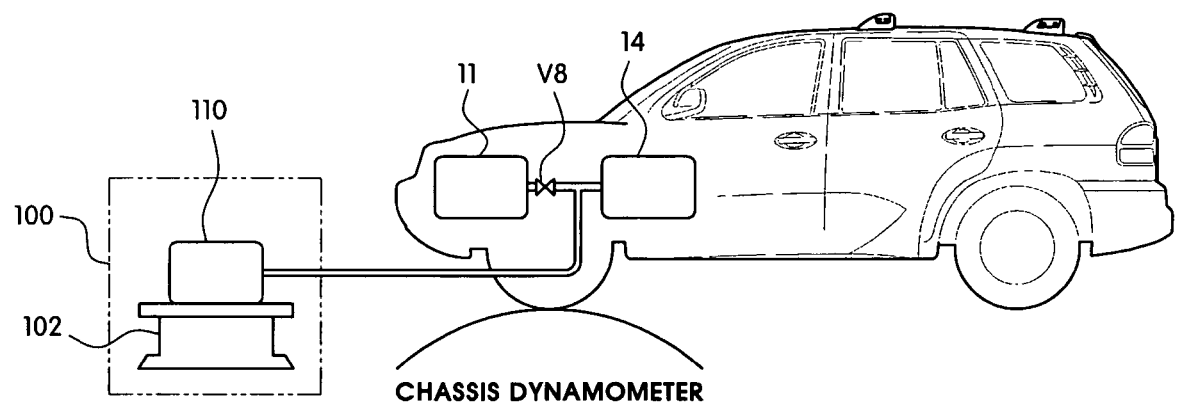
FIG. 2 is a conceptual diagram illustrating a fuel efficiency measurement method and system for a fuel cell vehicle in accordance with the present invention.

FIG. 2 is a conceptual diagram illustrating a fuel efficiency measurement method for a fuel cell vehicle in accordance with the present invention. As shown in the figure, a fuel efficiency measurement system 100 includes a fuel supply tank 110 having the same specification as a hydrogen tank 11 installed in the vehicle, and an electronic balance 102 for measuring a change in the amount of hydrogen supplied from the fuel supply tank 110.

In the above-described configuration, during the measurement of fuel efficiency, the hydrogen supply of the hydrogen tank 11 already installed in the vehicle is cut off by a valve V8, and instead the fuel supply tank 110 provided in the fuel efficiency measurement system 100 supplies hydrogen as a fuel to a fuel cell 14 of the vehicle. During vehicle operation, the amount of hydrogen supplied from the fuel supply tank 110, i.e., a change in weight of the fuel supply tank 110 is measured using the electronic balance 102 to calculate fuel efficiency.

Figure 3:
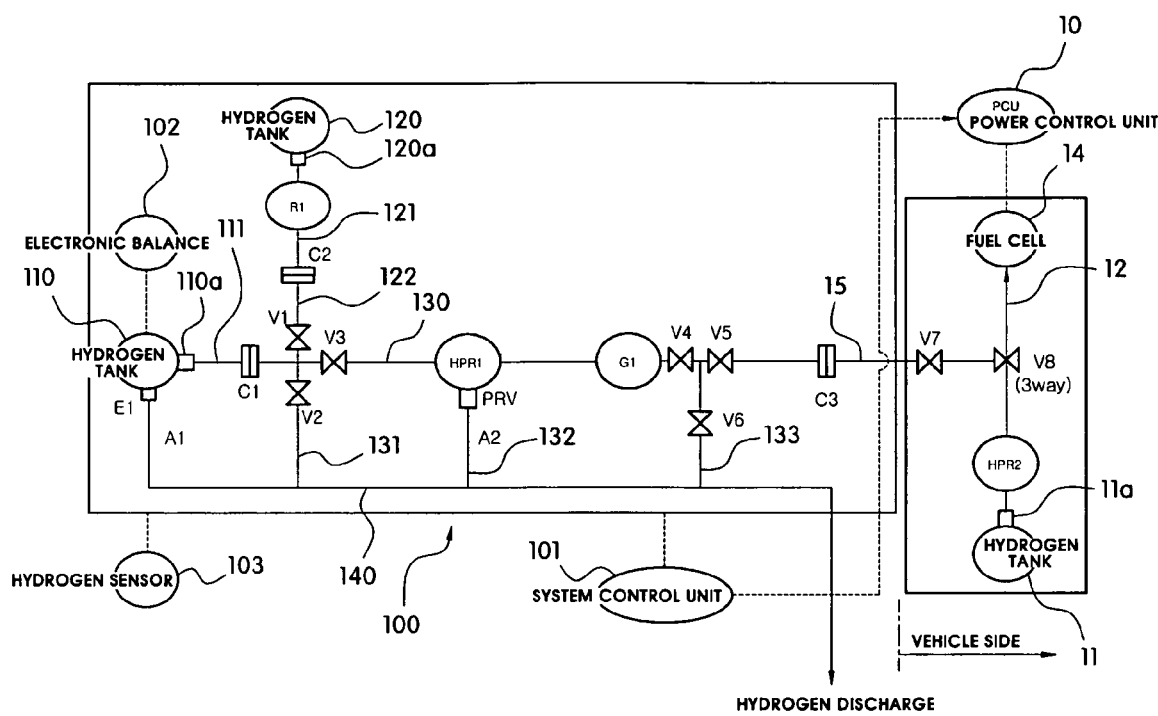
FIG. 3 is a configuration diagram showing a fuel efficiency measurement system for a fuel cell vehicle in accordance with a preferred embodiment of the present invention.
Figure 4:
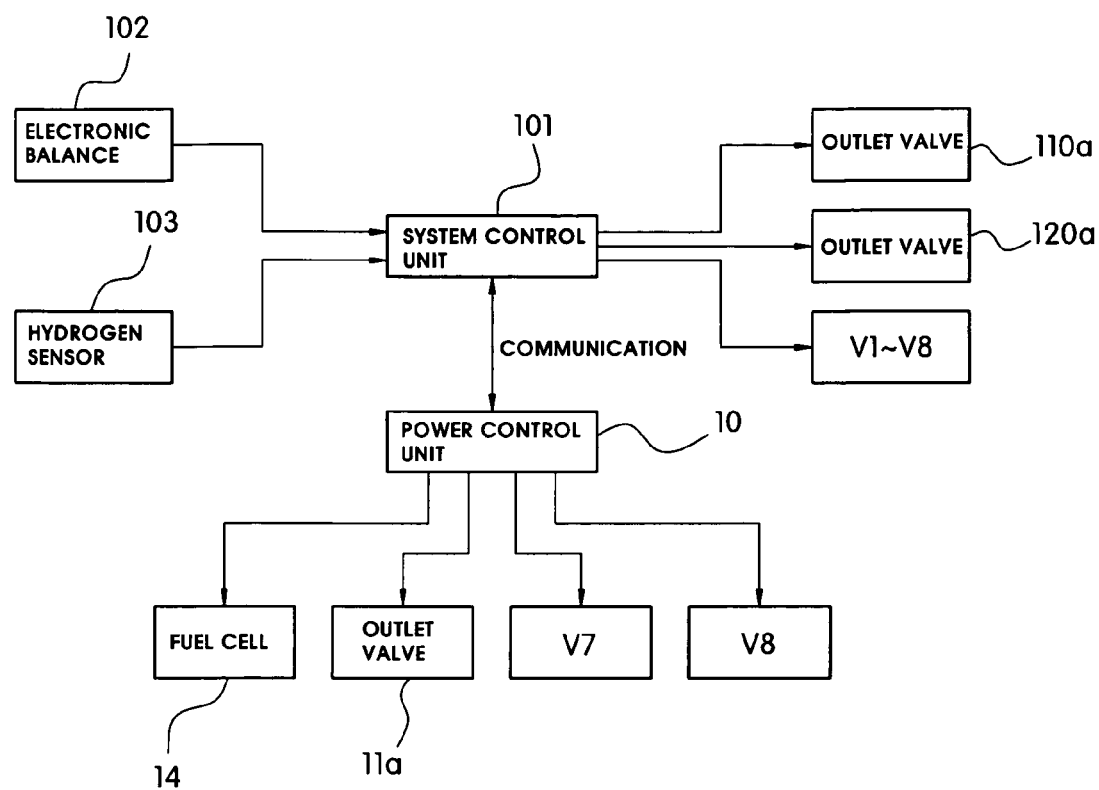
FIG. 4 is a block diagram showing a signal connection between a system control unit, a power control unit, and affiliated components in the fuel efficiency measurement system in accordance with a preferred embodiment of the present invention.

FIG. 3 is a configuration diagram showing a fuel efficiency measurement system in accordance with a preferred embodiment of the present invention, and FIG. 4 is a block diagram showing a signal connection between a system control unit, a power control unit, and affiliated components in the fuel efficiency measurement system in accordance with the present invention. As shown in the figures, as basic components of a hydrogen fuel cell vehicle, the vehicle is equipped with the fuel cell 14 that uses hydrogen as a fuel, the hydrogen tank 11 in which hydrogen as the fuel is filled at a high pressure of about 350 bar, a high pressure regulator HPR2 for regulating the pressure of the hydrogen tank 11 to a pressure of about 10 bar that can be applied to the fuel cell 14, and a power control unit (PCU) 10 for controlling the overall operation of a fuel cell system.

Moreover, a hydrogen injection pipe 15 branched from a hydrogen supply pipe 12 disposed between the high pressure regulator HPR2 and the fuel cell 14 and used to inject hydrogen into the vehicle, a 3-way valve V8 disposed at the branch position between the hydrogen supply pipe 12 and the hydrogen injection pipe 15, and an inlet valve V7 installed on the hydrogen injection pipe 15 are provided.

Meanwhile, the fuel efficiency measurement system 100 in accordance with the present invention includes a purge hydrogen tank 120 as well as the fuel supply tank 110 and the precision electronic balance 102.

The fuel supply tank 110 is a tank for supplying hydrogen to the vehicle during measurement of fuel efficiency. Preferably, it has the same specification as the hydrogen tank 11 mounted in the vehicle.

Moreover, a hydrogen discharge pipe 140 connected to the fuel supply tank 110 is provided to discharge the high-pressure hydrogen of the fuel supply tank 110 to the outside in emergency situations. The hydrogen discharge pipe 140 is connected to an excess flow valve E1 of the fuel supply tank 110.

The excess flow valve E1 is a kind of emergency discharge valve that is configured to be opened to discharge hydrogen in the fuel supply tank 110 to the outside through the hydrogen discharge pipe 140 in emergency situations where the tank pressure exceeds a predetermined pressure due to an excessive amount of hydrogen stored in the fuel supply tank 110, due to an increase in the internal temperature of the fuel supply tank 110 above a predetermined level, or due to a malfunction.

A hydrogen supply pipe 111 for supplying hydrogen stored in the fuel supply tank 110 to be used as a fuel is connected to the fuel supply tank 110, and an electronic outlet valve (e.g., solenoid valve) 110a is provided at the outlet of the fuel supply tank 110 to control the hydrogen supply through the hydrogen supply pipe 111.

Moreover, the fuel efficiency measurement system 100 includes a main pipe 130 connected to the hydrogen supply pipe 111 by a coupler C1. A high pressure regulator HPR1 for reducing the pressure (about 350 bar) of hydrogen supplied from the fuel supply tank 110 through the hydrogen supply pipe 111 to a pressure of about 10 bar that can be used in the fuel cell 14 of the vehicle is provided in the main valve 130. Preferably, the high pressure regulator HPR1 has the same specification as the high pressure regulator HPR2 installed in the vehicle.

A break-away coupler C3 is provided at the outlet of the main pipe 130 for the connection with the vehicle. Through the break-away coupler C3, the main pipe 130 is connected to an injection hole of the hydrogen injection pipe 15 installed in the vehicle so that hydrogen to be used as a fuel is supplied from the fuel supply tank 110 to the vehicle through the main pipe 130.

Break-away couplers conventionally used to connect the vehicle to a hydrogen filling system can be used as the break-away coupler C3. The break-away coupler C3 is provided to safely and efficiently separate the fuel efficiency measurement system 100 from the vehicle when the vehicle goes out of a chassis dynamometer during the fuel efficiency test.

Meanwhile, the purge hydrogen tank 120 is connected to a hydrogen supply pipe 121 through which hydrogen for purge stored in the purge hydrogen tank 120 is supplied. An electronic outlet valve 120a (e.g., solenoid valve) is provided at the outlet of the purge hydrogen tank 120 to control the hydrogen supply through the hydrogen supply pipe 121.

Moreover, a pressure gauge R1 for detecting a pressure of purge hydrogen is installed on the hydrogen supply pipe 121 of the purge hydrogen tank 120. The hydrogen supply pipe 121 is connected to a supply branch pipe 122 coupled to the main pipe 130 by a coupler C2. A valve V1 for controlling the hydrogen supply is installed on the supply branch pipe 122.

A first discharge branch pipe 131 branched between the coupler C1 and the high pressure regulator HPR1, provided to connect the fuel supply tank 110 to the main pipe 130, is connected to the hydrogen discharge pipe 140 from which hydrogen is discharged to the outside. A separate discharge pipe 132 is connected from the high pressure regulator HPR1 to the hydrogen discharge pipe 140 so that hydrogen discharged through a pressure relief valve PRV is sent to the hydrogen discharge pipe 140. Moreover, a second discharge branch pipe 133 branched between the high pressure regulator HPR1 and the break-away coupler C3 is also connected to the hydrogen discharge pipe 140.

The pressure relief valve PRV is a valve provided to prevent any problems that may occur in the fuel cell system when the high-pressure hydrogen is supplied to the vehicle in the event of a failure of the high pressure regulator HPR1. The pressure relief valve PRV is opened when an excess pressure occurs at the outlet side of the high pressure regulator HPR1, and thus hydrogen is forcibly discharged to the discharge pipe 132 and the hydrogen discharge pipe 140.

Valves V1 and V2 for opening and closing the flow path are provided on the supply branch pipe 122 and the first discharge branch pipe 131, and a valve V3 for opening and closing the flow path is provided on the main pipe 130 between the high pressure regulator HPR1 and the branch position of the supply branch pipe 122 and the first discharge branch pipe 131.

Moreover, a gauge G1 for measuring the hydrogen pressure is installed on the main pipe 130 at a downstream side of the high pressure regulator HPR1, a valve V4 is provided on the main pipe 130 between the high pressure regulator HPR1 and the branch position of the second discharge branch pipe 133, a valve V5 is provided on the main pipe 130 between the break-away coupler C3 and the branch position of the second discharge branch pipe 133, and a valve V6 is provided on the second discharge branch pipe 133, respectively.

Here, the valves V1 to V6 may, preferably, be embodied as explosion proof solenoid valves capable of opening and closing corresponding flow paths by electric signals output from a controller.

Meanwhile, the fuel efficiency measurement system 100 includes a system control unit 101 for controlling the overall operation of the system. The system control unit 101 receives a detection signal, i.e., a signal detected by measuring the change in weight of the fuel supply tank 110, from the electronic balance 102 and a vehicle driving distance during the measurement of fuel efficiency from the power control unit 10. Accordingly, the fuel efficiency measurement system 100 calculates fuel efficiency based on the amount of hydrogen used, a detection value of the electronic balance 102, and the vehicle driving distance transmitted from the power control unit 10.

The system control unit 101 outputs control signals to control the opening and closing operations of the respective valves 110a, 120a, and V1 to V8 provided in the fuel efficiency measurement system 100 and makes the power control unit 10 control the opening and closing operations of the valves 11a, V7 and V8 provided in the vehicle through communications with the power control unit 10.

Moreover, the system control unit 101 controls the valves and the respective safety devices through communications with the power control unit 10 to ensure the safety of the system that uses hydrogen.

Reference numeral 103 denotes a hydrogen sensor connected to the system control unit 101 so as to input a detection signal and, when a hydrogen amount above a predetermined value is detected based on the detection signal of the hydrogen sensor 103, the system control unit 101 closes the respective valves in the fuel efficiency measurement system 100, thus shutting down the fuel efficiency measurement system 100.

Next, the process of measuring fuel efficiency of the fuel cell vehicle using the above-described fuel efficiency measurement system will be described.

In principle, during the measurement of fuel efficiency, a test vehicle is driven on the chassis dynamometer and, at this time, the fuel supply tank 110 of the fuel efficiency measurement system 100 supplies hydrogen to the vehicle, in which the hydrogen supply system within the vehicle is shut down, so that the fuel cell 14 uses as a fuel hydrogen supplied from the fuel supply tank 110. Then, the fuel efficiency is calculated based on the change in weight of the fuel supply tank 110 before and after driving the vehicle and based on the vehicle driving distance on the chassis dynamometer.

As a first step, the residual air in the pipes is removed prior to the measurement of fuel efficiency. More specifically, the break-away coupler C3 is connected to the injection hole of the hydrogen injection pipe 15 in the vehicle. The break-away coupler C3 enables the system to be separated from the vehicle when the vehicle goes out of the chassis dynamometer during the fuel efficiency test, thus ensuring a stable hydrogen supply. Then, the valve V4 in the fuel efficiency measurement system 100 is closed, the 3-way valve V8 in the vehicle is shifted to connect the hydrogen injection pipe 15 and the hydrogen tank 11 of the vehicle, and the inlet valve V7 in the vehicle, the valve V5 in the fuel efficiency measurement system 100, the outlet valve 11a of the hydrogen tank 11, and the valve V6 are sequentially opened to remove the air in the pipes connected to the vehicle that uses hydrogen supplied from the hydrogen tank 11 of the vehicle, and then the valves are closed.

As a result, the purge and hydrogen filling process is performed using hydrogen supplied from the vehicle side, i.e., hydrogen of the hydrogen tank 11 in the vehicle. In particular, as the hydrogen of the hydrogen tank 11 in the vehicle is discharged to the outside through the main pipe 130, the second discharge branch pipe 133, and the hydrogen discharge pipe 140 connected through the hydrogen injection pipe 15 and the break-away coupler C3, the residual air in the system pipe after the valve V4 and the pipe in the vehicle is removed. Then, as the respective pipes are closed, hydrogen is filled in the pipes.

Here, if the respective valves in the fuel efficiency measurement system 100 are electronic valves, the operations of the respective valves in the fuel efficiency measurement system 100 and the vehicle are electrically controlled by the system control unit 101 and the power control unit 10. Such a control is applied to the operations of the respective valves to be described later in the same manner.

Meanwhile, the weight g1 of the fuel supply tank 110 prior to the measurement is transmitted to the system control unit 101 by the electronic balance 102.

To remove residual air in the pipes in the fuel efficiency measurement system 100 in a state where residual air between the valve V4 and the vehicle is removed, the valve V3 is closed, and then the valve V1, the outlet valve 120a of the purge hydrogen tank 120, and the valve V2 are sequentially opened to remove residual air in the pipe between the purge hydrogen tank 120 and the valve V3 using hydrogen of the purge hydrogen tank 120, and then the corresponding valves are closed. During removal of residual air, the hydrogen of the purge hydrogen tank 120 purges the corresponding pipes and is then discharged to the outside through the first discharge branch pipe 131 and the hydrogen discharge pipe 140.

In a state where the valve V5 is closed, the valves V1, V3 and V4, the outlet valve 120a of the purge hydrogen tank 120, and the valve V6 are opened to remove residual air in the pipe between the valves V3 and V4 using hydrogen of the purge hydrogen tank 120 and, at the same time, hydrogen is filled in the pipe, and then the respective valves are closed. During removal of residual air, the hydrogen of the purge hydrogen tank 120 purges the corresponding pipes and is then discharged to the outside through the second discharge branch pipe 133 and the hydrogen discharge pipe 140. Then, as the respective valves are closed, hydrogen is filled in the pipe.

On the other hand, the hydrogen discharge pipe 140 connected to the excess flow valve E1 of the fuel supply tank 110 discharges hydrogen at an excess pressure to the outside upon occurrence of a malfunction in the fuel supply tank 110, and the discharge pipe 132 connected to the pressure relief valve PRV of the high pressure regulator HPR1 discharges the high-pressure hydrogen to the hydrogen discharge pipe 140 in the event of a failure in the high pressure regulator HPR1. Accordingly, hydrogen is safely discharged to the outside through the hydrogen discharge pipe 140 in an emergency situation, thus preventing any risk.

When the residual air in the system pipes is all removed as described above, the conditions for carrying out the measurement of fuel efficiency are established. First, when a starter key is turn on for the measurement of fuel efficiency, the power control unit 10 sends an order to the system control unit 101 of the fuel efficiency measurement system 100 to open the outlet valve 110a of the fuel supply tank 110 and the valves V3 to V5. Moreover, the inlet valve V7 in the vehicle is opened and, at the same time, the 3-way valve V8 in the vehicle is shifted to connect the hydrogen injection pipe 15 and the pipe of the fuel cell 14. As a result, the hydrogen of the hydrogen tank 11 in the vehicle is not supplied to the vehicle during the measurement of fuel efficiency, instead, the fuel supply tank 110 of the fuel efficiency measurement system 100 supplies the whole quantity of hydrogen to be used as a fuel to the fuel cell 14 of the vehicle. Accordingly, the amount of hydrogen consumed in the fuel cell 14 to drive the vehicle during the measurement of fuel efficiency is equal to the amount of hydrogen supplied from the fuel supply tank 110 of the fuel efficiency measurement system 100, which corresponds to the change in weight of the fuel supply tank 110.

When the starter key is turned off to terminate the measurement of fuel efficiency, the power control unit 10 issues an order to the system control unit 101 of the fuel efficiency measurement system 100 to close the outlet valve 110a of the fuel supply tank 110 and the valves V3 to V5 at the very point of time when the vehicle is shut down. Moreover, the inlet valve V7 in the vehicle is closed and, at the same time, the 3-way valve V8 in the vehicle is shifted to connect the pipe of the hydrogen tank 11 and the pipe of the fuel cell 14.

After the external supply of hydrogen is cut off, the valve V2 is opened, and the weight g2 of the fuel supply tank 110 is transmitted to the system control unit 101 by the electronic balance 102. Since the high-pressure hydrogen is filled before and after the coupler C1, the hydrogen removal by opening the valve V2 facilitates the separation of the coupler C1 due to the pressure.

A difference between the weight g1 of the fuel supply tank 110 before the test and the weight g2 of the fuel supply tank 110 after the test is calculated, and the difference in weight and the driving distance received from the power control unit 10 are analyzed to calculate a gasoline equivalent fuel efficiency.

In the event that the amount of hydrogen of the fuel supply tank 110 is below an amount required to drive the vehicle, the hydrogen of the purge hydrogen tank 120 may be supplied as a fuel to perform the fuel efficiency test.

As described above, according to the fuel efficiency measurement system and method for a fuel cell vehicle, it is possible to accurately calculate fuel efficiency based on the change in weight of the external fuel supply tank before and after driving the vehicle using the fuel supply tank and the precision electronic balance, instead of using hydrogen of the hydrogen tank installed in the vehicle, thus allowing a more accurate measurement of fuel efficiency.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A fuel efficiency measurement system for a fuel cell vehicle equipped with a fuel cell that uses hydrogen as a fuel, the system comprising:
   a fuel supply tank configured to supply hydrogen to be used as a fuel to the fuel cell;

a main pipe which has an inlet end connected to a hydrogen supply pipe coupled to an outlet valve of the fuel supply tank and an outlet end connected to a hydrogen injection pipe of the vehicle such that hydrogen from the fuel supply tank is supplied to the hydrogen injection pipe;

a high pressure regulator provided on the main pipe configured to reduce the pressure of hydrogen supplied from the fuel supply tank to a pressure that can be used in the fuel cell;

a plurality of valves provided on the main pipe;

a hydrogen discharge pipe connected to an excess flow valve of the fuel supply tank to discharge hydrogen at an excess pressure of the fuel supply tank to the outside when the excess flow valve is opened;

an electronic balance configured to detect a weight of the fuel supply tank; and a system control unit configured to receive a detection value based on the weight of the fuel supply tank from the electronic balance, communicate with a power control unit in a state where the system is connected to the vehicle, and control the overall operation of various valves in the system and the vehicle and the overall operation of the system, wherein the system control unit calculates fuel efficiency based on a vehicle driving distance transmitted from the power control unit and a difference between weights of the fuel supply tank before and after driving the vehicle, detected by and transmitted from the electronic balance.

2. The system of claim 1, wherein the outlet end of the main pipe is connected to the hydrogen injection pipe of the vehicle by a break-away coupler so as to be easily separated from the vehicle in an emergency situation.

3. The system of claim 1, further comprising:

a purge hydrogen tank configured to remove residual air in the pipes in the system including the main pipe and supplying hydrogen to be filled in the pipes in advance prior to measurement of fuel efficiency;

a supply branch pipe branched from the main pipe and connected to a hydrogen supply pipe coupled to an outlet valve of the purge hydrogen tank;

a discharge branch pipe connecting the main pipe and the hydrogen discharge pipe so that hydrogen supplied from the purge hydrogen tank to the main pipe is discharged to the outside; and a plurality of valves provided on the supply branch pipe and the discharge branch pipe.

4. The system of claim 3, wherein the discharge branch pipe comprises a first discharge branch pipe branched from the main pipe at an upstream side of the high pressure regulator and connected to the hydrogen discharge pipe and a second discharge branch pipe branched from a downstream side of the high pressure regulator and connected to the hydrogen discharge pipe.

5. A fuel efficiency measurement method for a fuel cell vehicle equipped with a fuel cell that uses hydrogen as a fuel, the method comprising:

connecting a main pipe of a fuel efficiency measurement system to a hydrogen injection pipe of the vehicle;

receiving the information of a weight of a fuel supply tank in the fuel efficiency measurement system before turning on a starter key;

supplying through the main pipe and the hydrogen injection pipe of the vehicle hydrogen of the fuel supply tank in the fuel efficiency measurement system to the fuel cell of the vehicle to be used as a fuel in a state where the hydrogen supply to a hydrogen supply system in the vehicle is cut off during measurement of fuel efficiency;

calculating fuel efficiency based on a vehicle driving distance and a difference between weights of the fuel supply tank before and after driving the vehicle, wherein in a state where an outlet valve of a hydrogen tank in the vehicle is opened and the hydrogen supply to the fuel cell is cut off, hydrogen supplied from the hydrogen tank in the vehicle is discharged to the outside through the hydrogen supply pipe and the hydrogen injection pipe of the vehicle, the main pipe connected to the hydrogen injection pipe, and a hydrogen discharge pipe in the fuel efficiency measurement system so as to remove residual air in the main pipe in the fuel efficiency measurement system and the pipes in the vehicle and, at the same time, to fill hydrogen therein in advance before turning on the starter key.

6. The method of claim 5, wherein an outlet valve of a purge hydrogen tank in the fuel efficiency measurement system is opened to discharge hydrogen, supplied from the purge hydrogen tank, to the outside through the main pipe and the hydrogen discharge pipe of the fuel efficiency measurement system so as to remove residual air in the main pipe and, at the same time, to fill hydrogen therein in advance before turning on the starter key.

* * * * *